2,981,664
ALCOHOL RECOVERY PROCESS

William E. Sisco, Bound Brook, and John S. Wiederecht, Whitehouse, N.J., assignors to American Cyanamid Company, New York, N.Y., a corporation of Maine No Drawing. Filed Dec. 8, 1955, Ser. No. 551,720

1 Claim. (Cl. 202—57)

This invention relates to a process for the recovery of alcohol from the effluent from a purification of thiamine hydrochloride.

In the process of preparing thiamine hydrochloride or vitamin $B_1$, the last step of the synthesis involves oxidizing an intermediate called sulbone to a salt of thiamine, usually the sulfate. This product is then recovered and purified by recrystallization from ethanol. The ethanol effluent has a foul odor as a result of impurities which are formed in the last step of the thiamine manufacture. As the equation for this step is as follows

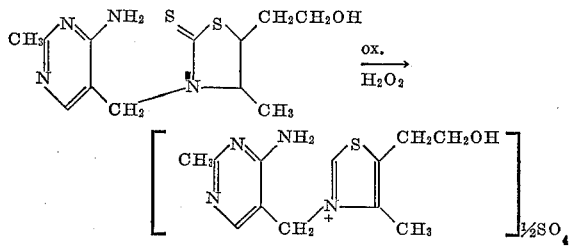

it will be apparent that the oxidation reaction removes one of the two atoms of sulfur present in the sulbone. As a result sulfur-containing by-products of indeterminate nature are formed, and it is believed that at least some of these products have an offensive odor. It is possible, of course, that the foul-smelling impurities are compounds which contain no sulfur; and although this possibility is a very remote one, the invention is not to be considered as limited to removing foul-smelling sulfur-containing compounds.

The amounts of alcohol in the effluent are large and constitute a serious financial loss if it is necessary to discard the effluent, and, because of the offensive odor, this effluent cannot be used for any chemical process known at the present time.

According to the present invention, the alcoholic effluent is heated, preferably at temperatures approaching the boil, with alkaline permanganate. The mixture is then subjected to fractional distillation and a relatively pure ethanol is obtained free from foul-smelling constituents and which, if necessary after suitable denaturing, for example, by the addition of methanol, can be reused and is of the quality which meets the standard for methanol-denatured alcohol. If it is attempted to distill without the permanganate treatment, an alcohol is obtained which still has an offensive odor and cannot be used after denaturing.

It is an advantage of the present invention that the reaction of the permanganate with the foul-smelling impurities is very rapid and only a short heating in the fractionating still is necessary before raising the temperature to the point at which fractionation takes place. The additional cost over ordinary fractional distillation is therefore substantially only the very small cost of the added alkali metal permanganate. It is obvious that the foul-smelling impurities react with the alkaline permanganate and are probably oxidized thereby. They are either destroyed or transformed into compounds which are not volatile. It is not known what the mechanism of the reaction is because the nature of the impurities is not known, and it is possible that several types of reaction are proceeding at the same time. The present invention is therefore not limited in any sense to any theory of what the mechanism of reaction of the permanganate is.

It should be understood that the problem which is solved by the present invention is the destruction or transformation of the foul-smelling impurities produced in the thiamine chloride synthesis and is not directed broadly to the use of alkaline permanganate in purification processes generally or even in the purification of alcoholic mixtures of different origin. Thus, as long ago as 1853 it has been proposed to treat fermentation mixtures containing ethanol with oxidizing agents such as potassium permanganate. This mixture contained the typical impurities of fermentation processes such as the various amyl alcohols and other materials which are collectively referred to as fusel oil. These impurities not only do not contain sulfur but they cannot exist as by-products in the synthesis of vitamin $B_1$ as the reaction of the last step of the synthesis is incapable of producing such compounds. It has therefore been known for more than a century that the permanganate does not seriously react with ethanol itself at the temperatures used in distilling the latter. This is all that was known and there is no relation to the problem solved by the present invention, namely, the destruction or transformation into non-volatile compounds of the foul-smelling by-products formed in the vitamin $B_1$ synthesis. As has been pointed out above, the present invention is not limited to any theory of how the permanganate works. In fact, it is most surprising that any effect is obtained because the impurities were formed by an oxidizing reaction. Ordinarily, impurities or other compounds which are produced by oxidation are unaffected by further treatment with an oxidizing agent. Why the foul-smelling impurities react with the permanganate is therefore not known.

It is an advantage of the present invention that the amounts of permanganate and alkali are small and hence involve no serious cost, and their amount is also not critical. In general, the amount of permanganate will range from somewhat under 0.1% by weight of the ethanol up to a percent or more while the corresponding amount of alkali metal hydroxide will vary from about 0.5% to 5%. The exact amount is in no sense critical and larger amounts may be employed. However, as no benefit is obtained, the additional cost is not warranted. In general, it is desirable to use as little as will completely remove odor. With most effluents we find that 0.2% permanganate and 2% sodium hydroxide is adequate. However, as the range is not critical, with unusually highly contaminated effluents a somewhat larger amount may be employed.

The fractional distillation which follows the heating with the alkaline permanganate proceeds along conventional lines and is in no way affected by the pretreatment used in the present invention. Thus in the conventional distillation procedures with a forerun fraction removed at high reflux, the main alcohol fraction is removed normally as approximately the water-alcohol azeotrope, and finally the still residue which contains the spent permanganate, alkali and water is discarded. Not only is the loss of permanganate and alkali very small because of the extremely small amounts used, but they do not attack the ordinary materials of which alcohol stills are constructed and thus involve no problem for the chemical engineer and no extra equipment is needed. The very slight additional time required for the pretreatment is negligibly small compared to the total time of distillation. It also is not critical. In general, it is carried out until no volatile compounds of offensive odor are present. Somewhat longer heating does no harm and thus an extremely critical supervision by highly skilled personnel is unnecessary as the heating time can be extended somewhat so that under all circumstances the destruction of odor is complete.

As pointed out above, the distillation procedure itself is carried out along purely conventional lines, and, if it is desired to produce anhydrous ethanol, this may be done by adding an additional component such as benzene, which forms a lower-boiling azeotrope with alcohol and water. Very commonly, the alcohol recovered by the process of the present invention will be denatured with methanol and this methanol may be added at any point, either with the alkali metal permanganate and alkali during the heating, during the distillation or to the final product obtained. The possibility of adding methanol to the distillation so that an additional denaturing step becomes unnecessary is a further advantage.

The invention will be described in greater detail in conjunction with the specific examples in which the parts are by weight unless otherwise specified.

Example 1

To 893 parts of an aqueous ethyl alcohol effluent from the manufacture of vitamin $B_1$ and which alcohol has an offensive odor not removable by distillation, there was added 4.5 parts of sodium hydroxide and 1.8 parts of potassium permanganate. The mixture was subjected to fractional distillation in conventional equipment. An alcohol fraction was obtained which had no objectionable odor and when mixed with a suitable quantity of methanol met all requirements for methanol-denatured alcohol for general use.

Example 2

A batch of 102,500 pounds of aqueous alcohol effluent from the manufacture of vitamin $B_1$ was introduced into a commercial steam still. To the charge were added 1000 pounds of 50% aqueous sodium hydroxide, 200 pounds of potassium permanganate and 8450 pounds of methanol. The charge was heated up to distillation temperature and fractionally distilled, producing 75,800 pounds of methanol-denatured ethanol. The still residue was discarded and the denatured alcohol produced had no objectionable odor and was satisfactory for general use.

We claim:

In a process of producing vitamin $B_1$ wherein a compound having the formula

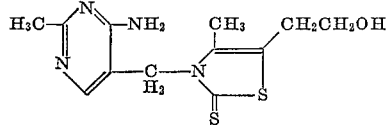

dissolved in aqueous alcoholic solution is subjected to oxidation with hydrogen peroxide, resultant vitamin $B_1$ being precipitated and the precipitate collected, whereby there is produced an aqueous alcoholic effluent containing foul-smelling, sulfur-containing by-products produced during said oxidation and which impurities cannot be separated from the ethanol content of said effluent by fractional distillation, the steps which consist in adding to said effluent per hundred parts ethanol from about 0.1 to about one part of an alkali permanganate and from about 0.5 to about five parts of an alkali metal hydroxide, heating the resultant mixture to about its boiling temperature, subjecting the heated solution to fractional distillation and collecting the ethanol distillate, whereby an ethanol distillate free from foul-smelling constituents is obtained.

References Cited in the file of this patent
UNITED STATES PATENTS

| | | |
|---|---|---|
| 2,083,856 | Moravec et al. | June 15, 1937 |
| 2,188,274 | Bump | Jan. 23, 1940 |
| 2,199,995 | Hickman | May 7, 1940 |
| 2,227,485 | Bump | Jan. 7, 1941 |
| 2,242,463 | Giesen et al. | May 20, 1941 |
| 2,302,600 | Cislak et al. | Nov. 17, 1942 |
| 2,320,939 | Leum | June 1, 1943 |
| 2,592,930 | Matsukawa et al. | Apr. 15, 1952 |
| 2,708,653 | Sisco et al. | May 17, 1955 |

OTHER REFERENCES

Industrial Solvents, 2nd Ed., Mellan, Reinhold Pub. Corp., N.Y., 1950, page 461.